INVENTORS
FREDERICK E. GRISWOLD
ROY C. CANFIELD
BY Charles S. Evans
THEIR ATTORNEY Patented Dec. 2, 1941

2,264,636

UNITED STATES PATENT OFFICE 2,264,636

WEEDING TOOL

Frederick E. Griswold and Roy C. Canfield, Lompoc, Calif.

Application October 12, 1940, Serial No. 360,930

3 Claims. (Cl. 30—314)

Our invention relates to a hand weeding tool; and it is among the objects of our invention to provide a tool particularly adapted for weeding areas difficult to reach, such as under pipe lines, fences and the like.

Another object is to provide a tool of the character described having a blade adapted to be moved in a plane lying substantially parallel with the surface of the ground, and provided with a handle so arranged as to give the best cutting action during such movement.

Another object is to provide a tool having a wedging action between a cutting edge of the blade and the handle to facilitate severing the stalks of large weeds.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawing.

Figure 1:
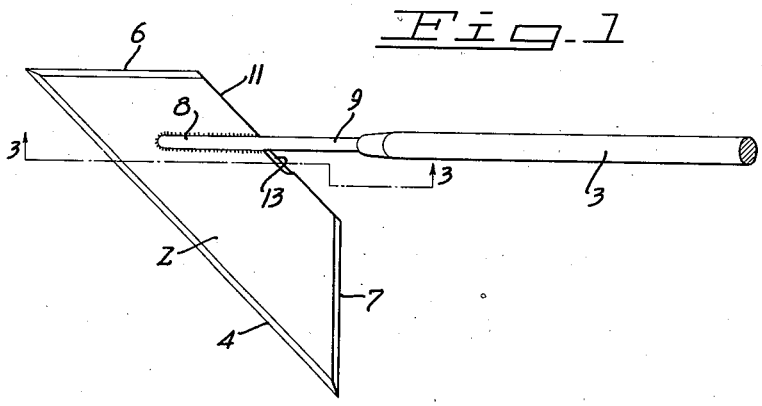
Figure 1 is a plan view of a tool embodying the improvements of our invention.
Figure 2:
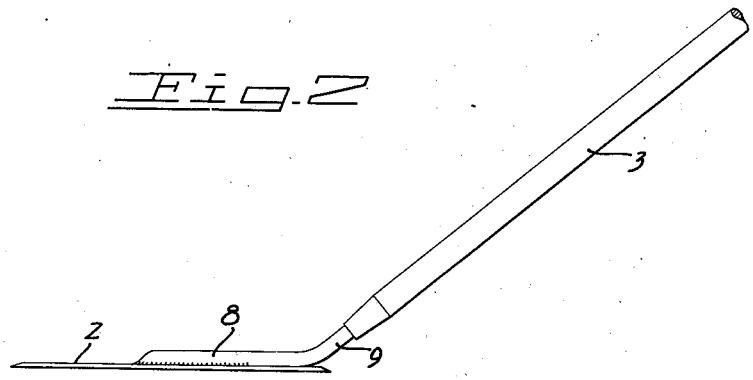
Figure 2 is a side elevational view of the same.
Figure 3:
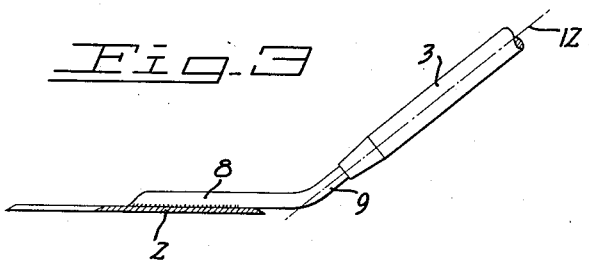
Figure 3 is a vertical sectional view taken in a plane indicated by line 3—3 of Figure 1.

In terms of broad inclusion, the weeding tool of our invention comprises a blade having angularly disposed cutting edges and adapted to lie substantially flat on the ground, and a handle extending downwardly toward the blade on an axis intercepting the plane of the blade at a point spaced outwardly from an edge of the latter. The shank of the handle is preferably disposed at an angle to an edge of the blade, and a cutting edge is preferably provided in the angle.

In greater detail, and referring to the drawing, our weeding tool comprises a metallic blade 2 mounted on a handle 3 so arranged that the blade normally lies substantially flat on the ground in the operating position. The blade is preferably trapezoid-shaped having a forward side cutting edge 4 and angularly disposed end cutting edges 6 and 7. The latter edges preferably intersect edge 4 at an angle of about 45°.

The blade is connected to the handle by a shank or tang having a portion 8 lying substantially in the plane of the blade and having a handle engaging portion 9 turned upwardly at a point spaced outwardly from rear edge 11 of the blade. Axis 12 of the downwardly extending handle thus intercepts the plane of the blade at a point spaced behind edge 11. The vertical angle between handle 3 and the plane of the blade is preferably about 35°, and the horizontal angle between shank portion 8 and edge 11 is preferably about 45°.

Shank portion 8 preferably lies flat against the upper surface of the blade and is preferably secured by brazing, the shank portion 8 preferably extending across the major portion of the blade width as a reinforcing member. The shank intercepts edge 11 at substantially its mid point, and continues across the face of the blade substantially parallel to edge 6. A cutting edge 13 is provided in the angle between the shank and the rear edge of the blade.

The particular arrangement between the handle and blade is very important. In the first place, the fact that the handle axis intercepts the plane of the blade at a point spaced behind the rear edge of the latter materially reduces the friction between the blade and ground when pressure is applied downwardly on the handle. Also, the rearwardly extending portion 8 of the shank enables the blade to be moved with greater facility and in more difficult places than if the handle axis intersected within the boundary of the blade. Another important feature of the handle arrangement is that the shank and rear edge of the blade provide a V-shaped notch or hook between which the stalks of weeds may be wedged; cutting edge 13 in the angle serving to readily sever the stalks of large weeds caught in the notch.

Another important feature of our tool is that cutting edges 4, 6 and 7 are so disposed as to give a shearing action when the blade is moved in cutting strokes. The cutting edges at the ends of the blade are disposed at angles best suited for getting at irregular and uneven surfaces such as found on banks and in ditches. The disposition of the shank toward the forward end of the blade, as shown in Figure 1, tends to keep the tool from being clogged with weeds, and also transmits pressure from the handle to the blade in a manner best suited for the cutting action. Further advantages of the tool are that it is light in weight; can be operated with a minimum amount of effort; will weed areas under pipe lines, fences and the like that are normally difficult to hoe under; will tend to keep the cut weeds on the surface of the ground instead of burying them; and will also tend to keep weed seeds from being buried where they can grow again.

We claim:

1. A weeding tool comprising a blade having a front cutting edge and angularly disposed end cutting edges, and a handle connected with the blade and lying in a plane intercepting the plane of the blade along a line extending angularly across the blade substantially parallel with one of said end edges and at substantially right angles to the other end edge.

2. A weeding tool comprising a blade having a front cutting edge and angularly disposed end cutting edges, and a handle connected with the blade and lying in a plane intercepting the plane of the blade along a line extending angularly across the blade substantially parallel with one of said end edges and at substantially right angles to the other end edge, the axis of said handle intercepting the plane of the blade at a point spaced outwardly from the rear edge of said blade.

3. A weeding tool comprising a blade having substantially parallel front and rear edges and having end cutting edges converging rearwardly at substantially 45 degrees to the front edge, and a handle connected with the blade and lying in a plane intercepting the plane of the blade along a line substantially parallel with one of said end edges and at substantially right angles to the other end edge.

FREDERICK E. GRISWOLD.
ROY C. CANFIELD.